Oct. 19, 1937. H. HOLZWARTH 2,095,984
EXPLOSION TURBINE PLANT
Filed July 14, 1933
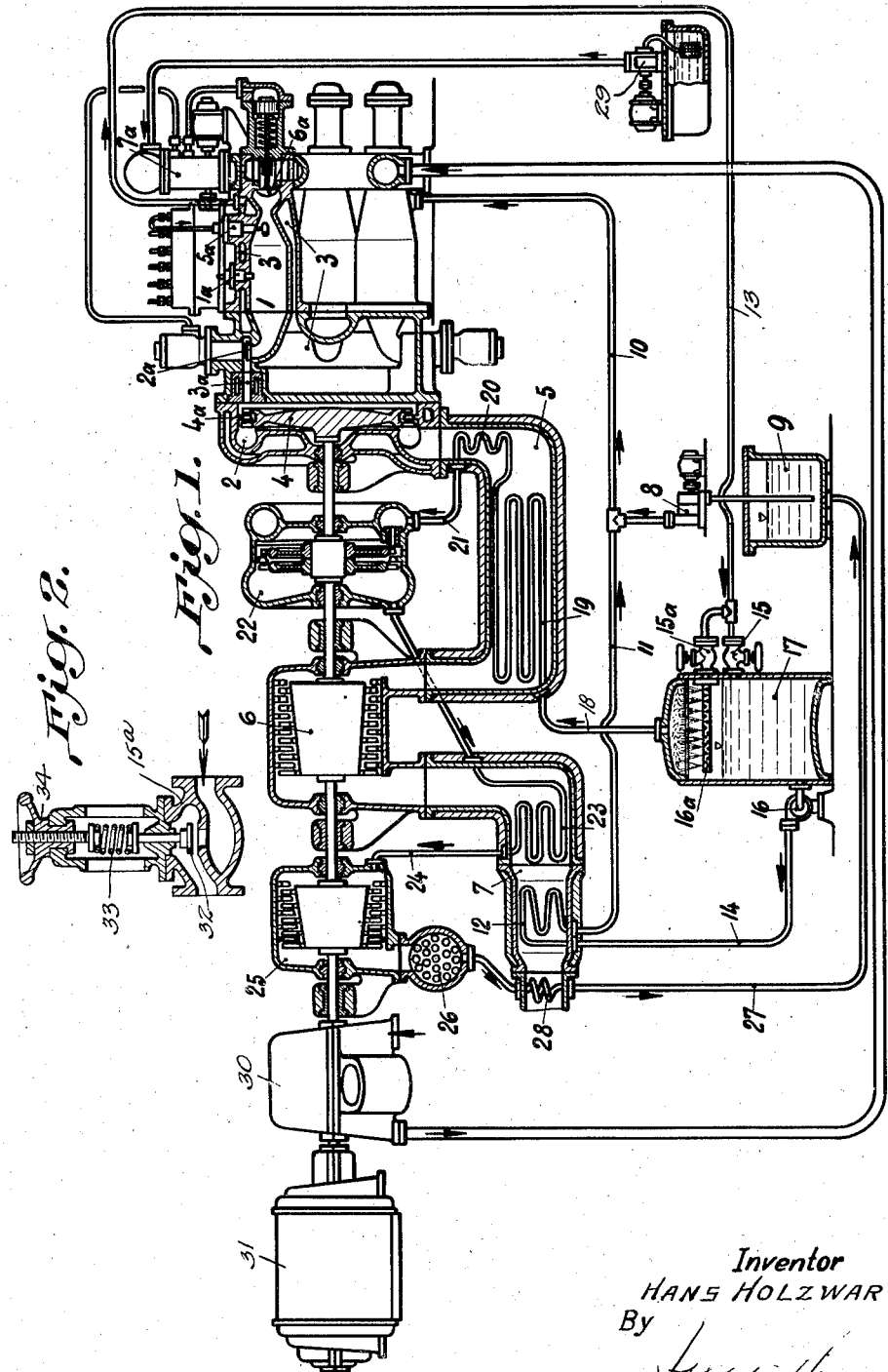
Inventor
HANS HOLZWARTH
By
Joseph Hirschman
Attorney Patented Oct. 19, 1937

2,095,984

UNITED STATES PATENT OFFICE 2,095,984

EXPLOSION TURBINE PLANT

Hans Holzwarth, Dusseldorf, Germany, assignor to Holzwarth Gas Turbine Co., San Francisco, Calif., a corporation of Delaware Application July 14, 1933, Serial No. 680,400
In Germany November 17, 1927

8 Claims. (Cl. 60—49)

In my copending application Serial No. 319,050, filed November 13, 1928, which has issued as Patent No. 1,929,428, dated October 10, 1933, and of which the present application is in part a continuation, I have described a gas turbine plant composed of an explosion turbine unit as the initial stage, and one or more continuous current turbines as the subsequent stages, and operated in such a manner that the combustion gases, before being charged into the continuous current turbine stages, are cooled by abstracting heat therefrom for superheating steam generated with the waste heat of the plant. The invention described in said application is based on the experience that the turbine stages operated by continuous currents of gas are exceedingly sensitive to high temperatures, and may be operated only by previously cooled combustion gases; on the other hand, in order to avoid rendering the process uneconomical, the excessive heat of the gases is transferred to steam as superheating heat, because such superheating heat can be utilized without substantial loss. The invention disclosed in said application embodies also an additional safeguard for the continuous current gas turbines by the provision of means for simultaneously charging steam into the continuous current gas turbine units following the explosion turbine. In this way an effective reduction of the temperature in the individual rotors or blade rings was secured.

I have now found that by suitable provisions forming the subject matter of the present invention, the gas turbines may be safely and efficiently operated without the aid of cooling steam. It is accordingly one of the objects of the present invention to provide a multi-turbine plant of the type above indicated wherein the combustion gases are expanded in pure gas turbines and wherein the steam generated, and if desired also superheated, by heat derived ultimately from the explosion gases, is expanded in pure steam turbines. By such procedure there results the technical advance that the construction of the continuous current turbines is greatly simplified, and that, further, the mixing of the steam with the combustion gases is completely avoided so that, on the one hand, the steam can be condensed in the usual manner so as to create a very low exhaust pressure, while on the other hand, the formation of sulphuric, sulphurous and other acids in the combustion gases, with resulting corrosion of various parts of the plant, is prevented. I have found that these advantages are accompanied by a high over-all efficiency, so that a practicable, reliable and economical gas turbine plant is obtained. My improved arrangement thus has in common with the arrangement described in my said prior application the features that the explosion gases are first charged intermittently into an explosion or impulse turbine and then in a constant stream into a continuous current turbine after previous cooling, a second driving medium (steam) being generated with heat taken from the explosion gases.

It is also an object of the invention to provide an explosion gas turbine plant wherein the gases are cooled before being charged from the explosion rotor into the continuous current turbine, and wherein the abstracted heat is made efficiently convertible into mechanical energy.

The present invention embodies, in common with said prior patent, the idea of supplying the latent heat of evaporation with heat that is more or less waste heat, and of cooling the high temperature, live gases by means of steam, so that the abstracted heat is made efficiently utilizable, as superheat, for generating power. It embodies, however, also another mode of producing steam of sufficient tension without reducing the high combustion gas temperatures necessary for superheating the steam. According to the present invention, the heat abstracted by a circulating cooling agent for the gas turbine section of the plant is utilized for the generation of steam. This abstracted heat can be utilized in various ways; for example, a cooling agent of high boiling point, such as oil, which has been heated to a high temperature in the cooling jackets of the gas turbine section of the plant, as described in my copending application Serial No. 512,342 (which has issued as Patent No. 2,012,963, dated Sept. 3, 1935), can be made to give up its heat in a separate heat exchanger to liquids of lower boiling point, such as water, so that the latter is vaporized, after which the vapor is superheated by means of the waste or excess heat of the gases in the manner described in my above-mentioned Patent No. 1,929,428. The auxiliary driving medium, such as steam, may also be generated by directly heating the parent liquid, such as water, in the cooling jackets of the gas turbine section under pressure, the superheated liquid being then partially decompressed and thereby evaporated. The vapor so formed can then be superheated by the hot combustion gases. Finally, the method of generating the steam described in my said Patent No. 1,929,428 can be utilized in addition to the methods just described in order to increase the quantity of steam generated so as to effect, by superheating of the steam, the desired cooling of the gases before their entry into the continuous current gas turbine or turbines.

The present invention contemplates also a further increase in the heat absorption, that is, the cooling capacity, of the steam by generating such steam as wet steam, preferably of a moisture content of 10–40%, if necessary with the aid of suitable known mechanical devices. The steam must be fed in wet condition to the combustion gas-heated heat exchangers if the very high gas temperatures cannot be sufficiently reduced in spite of repeated superheating and intermediate superheating of the steam and in spite of increase of the steam pressure.

The present application is a continuation in part of my copending application Serial No. 529,583, filed April 13, 1931 which discloses essentially the same invention as the present application, the latter showing in greater detail the devices for circulating cooling water under pressure, from which steam is generated, as described hereinbelow.

The accompanying drawing illustrates by way of example an embodiment of the present invention, the same being represented diagrammatically in vertical section in Fig. 1, Fig. 2 showing an enlarged section of one of the reducing valves shown in Fig. 1.

The explosion chambers 1 may be of any known or suitable type in which successive charges of fuel and air are ignited by a spark plug 1a under constant volume in a closed combustion space, the fuel being admitted by an injection device 5a and the air by the valve 6a; a nozzle valve 2a is opened after the explosion in each chamber to discharge the explosion gases in puffs into an expansion nozzle 3a in which the gases are partially expanded and which directs them against the blades 4a of an impulse rotor 4 of the initial turbine stage 2 of the plant. The explosion chambers 1, and if desired also other heated parts of the plant, are surrounded by jackets 3. The gases exhausting from the turbine 2 flow through a conduit 5, which is of large capacity and thus serves to equalize the fluctuations in pressure, to the continuous current turbine 6 operated only by such exhaust gases; after expansion in such turbine, the gases are discharged into the atmosphere through a conduit 7. The inlet and outlet mechanisms of the explosion chambers are operated to open and close at the proper instants by suitable timing mechanism, as by means of a pressure oil distributor 7a, the said mechanism being then of the hydraulic type.

A pump 8 feeds water from the supply tank 9 into the cooling jackets 3 of the explosion chambers by a pipe 10; this water replaces that withdrawn as working steam. The water circulating at high pressure in the cooling jackets 3 is heated to nearly the vaporization point which is much above 100° C. due to the high pressure. The heated cooling water is withdrawn by a pipe 13 and flows to the reducing valve 15 by which it is reduced to the pressure in the boiler 17 or to the reducing valve 15a and the sprayer pipe 16a. As the vaporization temperature falls below the temperature of the water as a result of the fall in pressure, a part of the water is converted into steam to which moisture may be added through sprayer pipe 16a. The unvaporized water is withdrawn from the boiler 17 by the circulating pump 16 which introduces the same under increased pressure through conduit 14 into preheater 12 arranged in the path of the gases exhausting from the continuous current turbine 6. The water heated in the preheater 12 flows through conduit 11 into conduit 10 where it unites with the water charged by the pressure pump 8 and the circulating cycle is thus repeated. The steam so formed is conducted by a conduit 18 into the superheaters 19 and 20 arranged in series in the exhaust conduit 5 of the explosion turbine 2. The superheated steam is withdrawn by a pipe 21 and charged into the high pressure steam turbine 22. The exhaust steam of the latter turbine is subjected to an interstage superheating in the superheater 23 arranged in the exhaust conduit 7 of the continuous current gas turbine 6, and is conveyed in superheated condition by a pipe 24 to the low pressure condensing steam turbine 25. The steam gives up its remaining available energy in this turbine and is condensed in the condenser 26. The condensate is returned by pipe 27 to the supply tank 9 after being preheated in the exchanger 28.

It will be understood from the above that the pressure of the water in the various heat exchangers, such as the cooling jackets of the explosion chambers, is so high that it can deliver steam of economical working pressures, say of the order of 20 atmospheres.

Thus it will be seen that, according to the present invention, steam is generated with heat that would ordinarily be lost anyway, namely, the heat contained in the completely exhausted gases and also the heat lost to the walls of the explosion chambers; while at the same time such a large quantity of steam is generated as to be capable of reducing the temperature of the gases exhausting from the explosion turbine sufficiently to enable them to be used safely in a pure gas turbine of the bulky reaction type. Moreover, as the heat abstracted from the hot gases is absorbed by the steam as superheat, there is practically no loss in working capacity by the heat transfer.

The pressure oil for operating the valves of the explosion chambers is fed to the distributor 7a by the motor-driven pump 29. The turbine may be mounted upon a common shaft which drives a compressor 30 for supplying the explosion chambers with compressed air, an output machine, such as an electric generator 31, being likewise driven by such shaft.

The reducing valves 15 and 15a may be of any suitable and known construction and may, for example, comprise a valve head 32 (Fig. 2) which is urged against its seat by the spring 33 under a predetermined pressure, the valve being automatically opened when the pressure in advance of the same rises above such predetermined value. The pressure of the spring 33 can be adjusted by the hand-wheel 34.

As indicated in the introductory part of this specification, the steam may be generated indirectly by means of a cooling agent of higher boiling point which is circulated between the cooling jackets 3 and a heat exchanger to which water is fed, as shown in my French Patent No. 643,630 (Fig. 1) dated Sept. 20, 1928. In place of water any other suitable working medium may be employed for the generation of the second or auxiliary driving fluid.

It will be clear from what has been said above that by "waste heat" I mean the heat which is in such condition that it can not ordinarily be utilized for the generation of power and is generally lost in a combustion engine power plant. This waste heat includes the heat abstracted by the cooling agent in the various jackets, and particularly in the cooling jackets about the explosion chambers and also the heat contained in the completely exhausted gases leaving the last gas turbine, and the term is to be understood in this sense in the appended claims.

Other variations may be resorted to within the scope of the appended claims without departing from the spirit of the invention.

I claim:

1. An explosion turbine plant comprising an impulse rotor, pistonless explosion chambers for generating explosion gases under constant volume at high pressure, and nozzles for partially expanding such gases and directing them against the rotor, said rotor being driven exclusively by said gases; controlled air and fuel inlet members for intermittently charging the chambers with explosive mixtures for explosion therein, and controlled outlet members associated with said chambers for discharging the intermittent puffs of explosion gases into the nozzles; a continuous current gas turbine driven exclusively by the explosion gases; a conduit for leading to the latter turbine the gases exhausting from the impulse rotor; a steam superheater arranged in the path of the gases in advance of the continuous current turbine; apparatus for heating water under pressure to the vaporization temperature with the waste heat of the plant in such quantity as to be capable of yielding steam of working pressure at a rate sufficient to abstract, in the form of superheat, so much heat from the live gases in said conduit as to enable such gases to be used in the continuous current turbine without injury thereto, said apparatus including cooling jackets about the explosion chambers, mechanism for circulating cooling medium through said jackets, and means wherein steam under working pressure is produced by the heated cooling medium; a conduit for conducting the generated steam to said superheater; a steam turbine; and a conduit leading the steam from the superheater to the steam turbine to drive the latter, the latent heat of vaporization of said steam being thus all supplied by the waste heat of the plant, while the excess heat of the live gases in advance of the second turbine is transferred to the steam as work-producing superheat.

2. A turbine plant as set forth in claim 1 wherein the apparatus for heating water under pressure to the vaporization temperature includes a heat exchanger located in the path of the gases exhausting from the lower gas turbine stage.

3. A turbine plant as set forth in claim 1, wherein the cooling agent is water and wherein said means comprises an evaporator in which the heated water is caused to deliver steam under working pressure.

4. A turbine plant as set forth in claim 1, wherein the steam superheater is located in the path of the gases exhausting from the explosion turbine.

5. A turbine plant comprising an explosion turbine including an impulse rotor, explosion chambers for generating explosion gases under constant volume and nozzles for partially expanding such gases and directing them against the rotor, said turbine rotor driven exclusively by said gases; a continuous current turbine driven exclusively by combustion gases; a conduit for leading to the latter turbine the gases exhausting from the explosion turbine; a steam superheater arranged in the path of the gases in advance of the continuous current turbine; means for generating steam with the waste heat of the gas turbine plant in such quantity as to be capable of abstracting, in the form of superheat, sufficient heat from the gases in said conduit to enable such gases to be used in said continuous current gas turbine; means for feeding water to said steam generating means; a conduit for conducting the generated steam to said superheater; a steam turbine; a conduit leading the steam from the superheater to the steam turbine to drive the latter; a second condensing steam turbine; an interstage superheater arranged in the path of the gases following the explosion turbine; a conduit for conducting to said superheater the steam exhausting from the first-mentioned steam turbine; and a conduit connecting said interstage superheater and said condensing steam turbine.

6. A turbine plant as set forth in claim 1, including a steam superheater arranged in the path of the gases exhausting from the continuous current gas turbine, means for conducting to such superheater steam which was generated with the waste heat of the plant, and a conduit for leading such steam to a place of use.

7. A turbine plant comprising an impulse rotor, an explosion chamber for generating explosion gases under constant volume, and a nozzle for partially expanding the gases and directing them against the rotor, said rotor being driven exclusively by explosion gases; a second gas turbine driven exclusively by explosion gases; a conduit for leading to the latter turbine the gases exhausting from the impulse rotor; a steam superheater arranged in the path of the gases in advance of the second turbine; a conduit for conducting steam into the superheater; means including a cooling jacket about the walls of the explosion chamber for generating at working pressure at least part of the steam conducted to the superheater with the waste heat of the plant; mechanism for feeding water to said steam generating means; a steam turbine; and a conduit leading the steam from the superheater to the steam turbine to drive the latter, the latent heat of vaporization of the steam being thus supplied by the waste heat of the plant, while the excess heat of the gases is transferred as superheating heat to the steam.

8. A turbine plant as set forth in claim 7, including steam generating apparatus arranged in the path of the gases discharging from the second gas turbine and connected with the steam conduit leading to the superheater.

HANS HOLZWARTH.